(12) United States Patent
Kobayashi

(10) Patent No.: US 10,248,806 B2
(45) Date of Patent: Apr. 2, 2019

(54) INFORMATION PROCESSING APPARATUS, INFORMATION PROCESSING METHOD, CONTENT MANAGEMENT SYSTEM, AND NON-TRANSITORY COMPUTER-READABLE STORAGE MEDIUM

(71) Applicant: CANON KABUSHIKI KAISHA, Tokyo (JP)

(72) Inventor: Tomoyuki Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 15/259,656

(22) Filed: Sep. 8, 2016

(65) Prior Publication Data
US 2017/0076108 A1 Mar. 16, 2017

(30) Foreign Application Priority Data
Sep. 15, 2015 (JP) ................. 2015-182224

(51) Int. Cl.
| G06F 21/00 | (2013.01) |
| G06F 21/62 | (2013.01) |
| H04L 29/06 | (2006.01) |
| G06F 21/60 | (2013.01) |

(52) U.S. Cl.
CPC ........ G06F 21/6218 (2013.01); G06F 21/604 (2013.01); H04L 63/102 (2013.01)

(58) Field of Classification Search
CPC ... G06F 21/6218; G06F 21/604; H04L 63/102
See application file for complete search history.

(56) References Cited

U.S. PATENT DOCUMENTS

| 5,819,250 A * | 10/1998 | Trader ............ G06F 17/30017 707/758 |
| 6,405,202 B1 * | 6/2002 | Britton ............ G06F 17/30607 |
| 6,405,226 B1 * | 6/2002 | Alpert ............ G06F 17/30014 707/E17.013 |
| 6,421,675 B1 * | 7/2002 | Ryan ................... G06F 17/3061 |
| 6,625,335 B1 * | 9/2003 | Kanai ............ G06F 17/30259 382/177 |
| 6,751,613 B1 * | 6/2004 | Lee .................. G06F 17/30265 |
| 7,222,131 B1 * | 5/2007 | Grewal ................. G05B 19/05 707/695 |

(Continued)

FOREIGN PATENT DOCUMENTS

| JP | 2001-344245 A | 12/2001 |
| JP | 2008-083961 A | 4/2008 |

*Primary Examiner* — David Garcia Cervetti
(74) *Attorney, Agent, or Firm* — Carter, DeLuca & Farrell LLP

(57) ABSTRACT

An information processing apparatus manages a plurality of content items, keywords associated with the plurality of content items respectively, and authorities set to associations between the keywords and the content items, obtains a keyword and identification information of a user, input by an operation of the user, searches for a content item associated with the input keyword among the managed plurality of content items, and decides whether the searched content item should be provided to the user or whether provision should be restricted, based on identification information of the user and an authority set for an association between the input keyword and the searched content item.

16 Claims, 15 Drawing Sheets

(56) References Cited

U.S. PATENT DOCUMENTS

| | | | | |
|---|---|---|---|---|
| 7,222,134 | B1* | 5/2007 | Maruyama | G06F 21/6218 |
| 7,630,586 | B2* | 12/2009 | Yasukaga | G06F 21/606 |
| | | | | 382/305 |
| 7,827,158 | B2* | 11/2010 | Hayakawa | G06F 17/30648 |
| | | | | 707/688 |
| 8,521,743 | B2* | 8/2013 | Satow | G06F 17/30864 |
| | | | | 707/738 |
| 8,763,155 | B1* | 6/2014 | Ben Chetrit | G06F 21/629 |
| | | | | 379/93.02 |
| 9,467,531 | B1* | 10/2016 | Holden | H04L 67/306 |
| 9,489,119 | B1* | 11/2016 | Smith, Jr. | G06F 3/0486 |
| 9,569,549 | B1* | 2/2017 | Jenkins | G06F 17/30241 |
| 9,697,294 | B2* | 7/2017 | Kim | G06F 17/30876 |
| 9,697,349 | B2* | 7/2017 | Li | G06Q 10/103 |
| 9,705,926 | B2* | 7/2017 | John | G06F 21/6245 |
| 9,712,535 | B1* | 7/2017 | Rossman | H04L 63/1433 |
| 9,940,476 | B2* | 4/2018 | Balasubramanian | |
| | | | | G06F 21/6227 |
| 2002/0015496 | A1* | 2/2002 | Weaver, III | H04L 12/1836 |
| | | | | 380/241 |
| 2002/0099685 | A1* | 7/2002 | Takano | G06F 17/30011 |
| 2003/0088581 | A1* | 5/2003 | Maze | G06F 17/30011 |
| 2003/0125929 | A1* | 7/2003 | Bergstraesser | G06F 17/2735 |
| | | | | 704/9 |
| 2003/0177124 | A1* | 9/2003 | Sauri | G06F 17/30011 |
| 2003/0233224 | A1* | 12/2003 | Marchisio | G06F 17/271 |
| | | | | 704/4 |
| 2004/0092250 | A1* | 5/2004 | Valloppillil | H04L 51/38 |
| | | | | 455/412.1 |
| 2005/0144295 | A1* | 6/2005 | Tsunoda | G06F 17/30702 |
| | | | | 709/228 |
| 2005/0165613 | A1* | 7/2005 | Kim | G06F 17/30017 |
| | | | | 705/1.1 |
| 2005/0216524 | A1* | 9/2005 | Gomes | G06F 17/30578 |
| 2005/0257140 | A1* | 11/2005 | Marukawa | G06F 17/218 |
| | | | | 715/255 |
| 2006/0136412 | A1* | 6/2006 | Watanabe | G06F 17/30011 |
| 2006/0143159 | A1* | 6/2006 | Chowdhury | G06F 17/30634 |
| 2006/0190483 | A1* | 8/2006 | Takahashi | G06F 17/30722 |
| 2006/0236338 | A1* | 10/2006 | Shimoda | G06F 17/30817 |
| | | | | 725/37 |
| 2007/0005564 | A1* | 1/2007 | Zehner | G06F 17/30592 |
| 2007/0118508 | A1* | 5/2007 | Svendsen | G06F 17/30265 |
| 2007/0168179 | A1* | 7/2007 | Markanthony | G06F 17/30864 |
| | | | | 704/4 |
| 2007/0198495 | A1* | 8/2007 | Buron | G06F 17/3087 |
| 2007/0203901 | A1* | 8/2007 | Prado | G06Q 30/02 |
| 2007/0255695 | A1* | 11/2007 | Hu | G06F 17/30265 |
| 2007/0282815 | A1* | 12/2007 | Kim | G06F 17/30873 |
| 2008/0147643 | A1* | 6/2008 | Takahashi | G06F 17/30864 |
| 2008/0159383 | A1* | 7/2008 | Kukreja | G06F 17/30793 |
| | | | | 375/240.01 |
| 2008/0216123 | A1* | 9/2008 | Takagi | H04N 5/782 |
| | | | | 725/58 |
| 2008/0228479 | A1* | 9/2008 | Prado | G06Q 30/02 |
| | | | | 704/235 |
| 2008/0320600 | A1* | 12/2008 | Pandiscia | H04L 9/3231 |
| | | | | 726/27 |
| 2009/0006285 | A1* | 1/2009 | Meek | G06Q 10/10 |
| | | | | 706/12 |
| 2009/0076908 | A1* | 3/2009 | Ingleshwar | G06Q 30/02 |
| | | | | 705/14.69 |
| 2009/0089162 | A1* | 4/2009 | Davis | G06Q 30/00 |
| | | | | 705/14.73 |
| 2009/0092374 | A1* | 4/2009 | Kulas | H04N 7/173 |
| | | | | 386/248 |
| 2009/0094520 | A1* | 4/2009 | Kulas | G06F 17/30056 |
| | | | | 715/723 |
| 2009/0144560 | A1* | 6/2009 | Takenaka | G06F 17/30265 |
| | | | | 713/189 |
| 2009/0232351 | A1* | 9/2009 | Kagitani | G06F 21/36 |
| | | | | 382/100 |
| 2009/0248681 | A1* | 10/2009 | Shibata | G06F 17/30011 |
| 2009/0259625 | A1* | 10/2009 | Kataoka | G06F 17/30997 |
| 2010/0036836 | A1* | 2/2010 | Stephens, Jr. | G06F 21/6218 |
| | | | | 707/783 |
| 2010/0145985 | A1* | 6/2010 | Takahashi | G06F 17/30637 |
| | | | | 707/769 |
| 2010/0211674 | A1* | 8/2010 | Sugahara | G06Q 10/00 |
| | | | | 709/224 |
| 2010/0262622 | A1* | 10/2010 | Saito | G06F 17/30241 |
| | | | | 707/780 |
| 2010/0279667 | A1* | 11/2010 | Wehrs | G06Q 30/02 |
| | | | | 455/414.1 |
| 2011/0225139 | A1* | 9/2011 | Wang | G06F 17/30867 |
| | | | | 707/709 |
| 2011/0238495 | A1* | 9/2011 | Kang | G06Q 30/02 |
| | | | | 705/14.49 |
| 2011/0307496 | A1* | 12/2011 | Jones | G06F 17/30386 |
| | | | | 707/748 |
| 2012/0030187 | A1* | 2/2012 | Marano | G06F 21/6218 |
| | | | | 707/709 |
| 2012/0041947 | A1* | 2/2012 | Maeda | G06F 17/30675 |
| | | | | 707/722 |
| 2012/0067954 | A1* | 3/2012 | Moganti | H04N 5/232 |
| | | | | 235/451 |
| 2012/0072420 | A1* | 3/2012 | Moganti | G06F 17/30265 |
| | | | | 707/737 |
| 2012/0072463 | A1* | 3/2012 | Moganti | G06Q 10/0875 |
| | | | | 707/803 |
| 2012/0078709 | A1* | 3/2012 | Dunham | G06Q 30/0242 |
| | | | | 705/14.42 |
| 2012/0095983 | A1* | 4/2012 | Lee | G06F 17/30867 |
| | | | | 707/706 |
| 2012/0158747 | A1* | 6/2012 | Satow | G06F 17/30864 |
| | | | | 707/748 |
| 2012/0179703 | A1* | 7/2012 | Ajitomi | G06F 17/30386 |
| | | | | 707/765 |
| 2012/0224043 | A1* | 9/2012 | Tsurumi | H04N 21/4223 |
| | | | | 348/78 |
| 2012/0297201 | A1* | 11/2012 | Matsuda | G06F 21/6245 |
| | | | | 713/189 |
| 2012/0323892 | A1* | 12/2012 | Nakayama | G06F 17/30011 |
| | | | | 707/722 |
| 2012/0324240 | A1* | 12/2012 | Hattori | G06F 21/6227 |
| | | | | 713/189 |
| 2013/0046761 | A1* | 2/2013 | Soderberg | G06F 17/30038 |
| | | | | 707/736 |
| 2013/0089300 | A1* | 4/2013 | Soundararajan | H04N 9/8205 |
| | | | | 386/241 |
| 2013/0110802 | A1* | 5/2013 | Shenoy | G06F 17/30876 |
| | | | | 707/706 |
| 2013/0124571 | A1* | 5/2013 | Yasufuku | G06F 17/30961 |
| | | | | 707/797 |
| 2013/0254190 | A1* | 9/2013 | Nakano | G06F 17/30554 |
| | | | | 707/727 |
| 2013/0282753 | A1* | 10/2013 | Sugimoto | G06F 17/30424 |
| | | | | 707/769 |
| 2013/0326338 | A1* | 12/2013 | Secord | G06F 17/30268 |
| | | | | 715/243 |
| 2014/0002863 | A1* | 1/2014 | Hasegawa | H04N 1/21 |
| | | | | 358/1.16 |
| 2014/0059079 | A1* | 2/2014 | Oka | G06F 17/30542 |
| | | | | 707/780 |
| 2014/0074855 | A1* | 3/2014 | Zhao | G06F 17/3002 |
| | | | | 707/746 |
| 2014/0122900 | A1* | 5/2014 | Kaushik | G06F 17/30424 |
| | | | | 713/189 |
| 2014/0195509 | A1* | 7/2014 | Iwasaki | G06F 17/30864 |
| | | | | 707/706 |
| 2014/0258214 | A1* | 9/2014 | Tsukamoto | H04L 12/1831 |
| | | | | 707/608 |
| 2015/0134648 | A1* | 5/2015 | Deshpande | G06F 17/30554 |
| | | | | 707/723 |
| 2015/0169888 | A1* | 6/2015 | McClendon | G06F 21/6218 |
| | | | | 707/785 |
| 2015/0178392 | A1* | 6/2015 | Jockisch | G06F 17/30867 |
| | | | | 707/706 |

(56) References Cited

U.S. PATENT DOCUMENTS

| | | | |
|---|---|---|---|
| 2015/0248484 A1* | 9/2015 | Yu | G06F 17/30867 707/711 |
| 2015/0269628 A1* | 9/2015 | Urtso | G06Q 30/0269 705/14.66 |
| 2016/0037227 A1* | 2/2016 | Benn | H04N 21/4828 725/53 |
| 2016/0092419 A1* | 3/2016 | Farouki | G06F 17/30268 715/202 |
| 2016/0117495 A1* | 4/2016 | Li | G06Q 10/103 726/1 |
| 2016/0117520 A1* | 4/2016 | Safa | H04W 4/21 726/26 |
| 2016/0210443 A1* | 7/2016 | Arngren | H04L 9/0822 |
| 2016/0277378 A1* | 9/2016 | Balasubramanian | H04L 63/20 |
| 2016/0283508 A1* | 9/2016 | Suzuki | G06F 17/30368 |
| 2016/0364388 A1* | 12/2016 | Balasubramanian | G06F 21/6227 |
| 2017/0012993 A1* | 1/2017 | Lieu | G06F 17/241 |
| 2017/0046448 A1* | 2/2017 | Suzuki | G06F 17/30876 |
| 2017/0126697 A1* | 5/2017 | Li | G06Q 10/103 |
| 2017/0262154 A1* | 9/2017 | Black | G06F 3/011 |

\* cited by examiner

SELECTOR SEARCH

⊞ 121112
⊞ 121120
■ ENOSHIMA
■ KAMAKURA
KEYWORDS
▽ SCENE
  ▽ JAPAN
    ▼ ENOSHIMA
    ▼ KAMAKURA

SEARCH TERMS: KEYWORD[ENOSHIMA] — 311

RAW ★★★
JPEG ★
JPEG ★★★★★
JPEG ☆☆☆☆☆
RAW ★★★★★
TIFF ★★★★★

FILE INFORMATION
FILE NAME:
FOLDER:
CAPTURE DATE AND TIME:
COMMENT:

KEYWORDS

INPUT KEYWORDS HERE

META DATA
LENS:
CAMERA:
SIZE:

EVENT
◄ 2012 NOV. ►
M T W T F S S
· · · · · · ·
· · · · · · ·
· · · · · · ·
[12] · · · · · ·
· · · · · · ·

EVENT IN THIS DAY
SHONAN MOOK

301

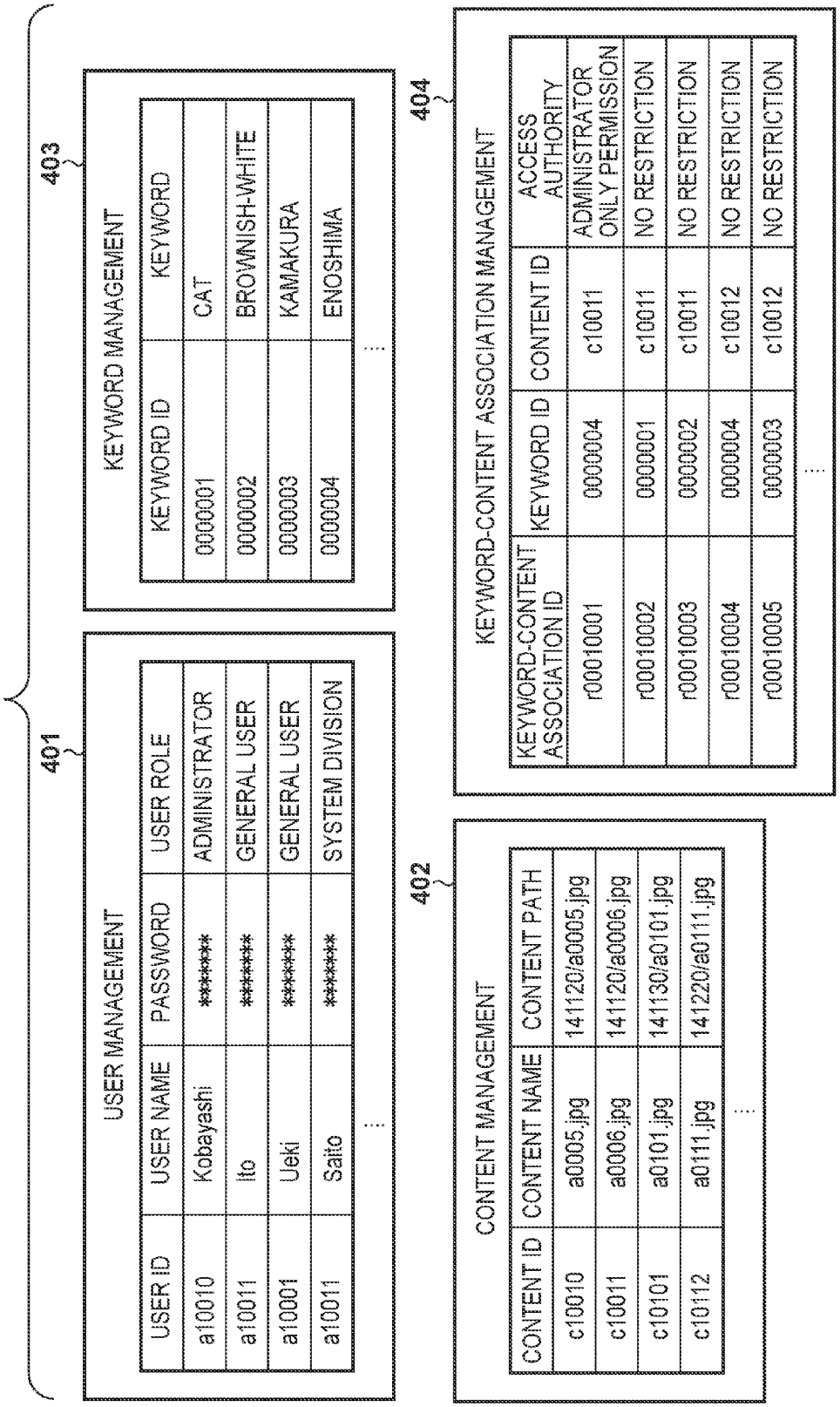

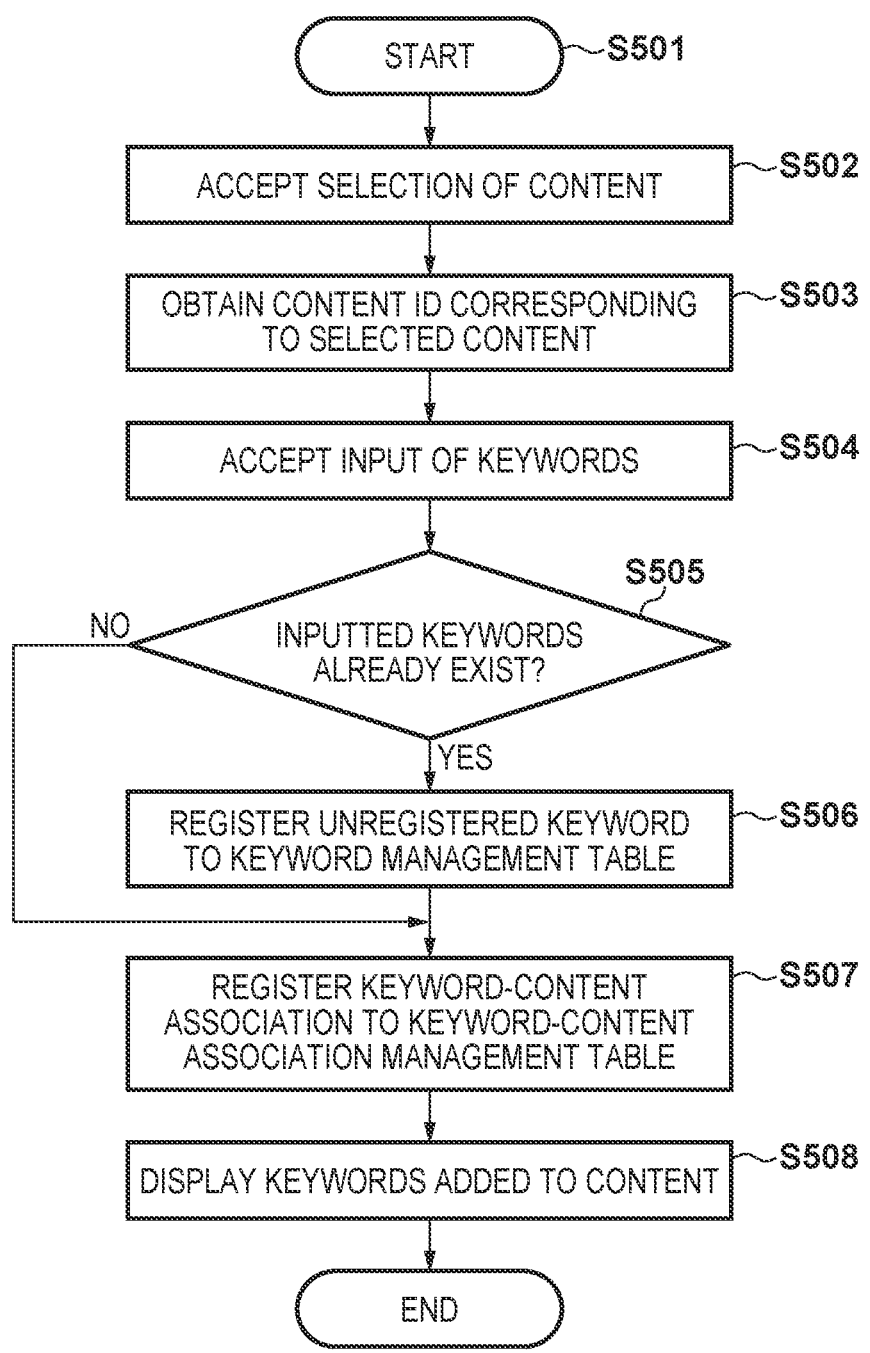

SELECTOR SEARCH

SEARCH TERMS: KEYWORD[ENOSHIMA]

⊞ 121112
⊞ 121120
⊞ ENOSHIMA
⊞ KAMAKURA

KEYWORDS
▽ SCENE
 ▽ JAPAN
  ▼ ENOSHIMA
  ▼ KAMAKURA

2012 NOV.
M T W T F S S
. . . . . . .
12 . . . . . .

EVENT IN THIS DAY
SHONAN MOOK

RAW ☆☆☆

FILE INFORMATION
FILE NAME:
FOLDER:
CAPTURE DATE AND TIME:
COMMENT:

KEYWORDS

INPUT KEYWORDS HERE

EVENT

META DATA
LENS:
CAMERA:
SIZE:

INFORMATION PROCESSING APPARATUS, INFORMATION PROCESSING METHOD, CONTENT MANAGEMENT SYSTEM, AND NON-TRANSITORY COMPUTER-READABLE STORAGE MEDIUM

BACKGROUND OF THE INVENTION

Field of the Invention

The present invention relates to a technique for managing authorities to access a plurality of content items.

Description of the Related Art

In Japanese Patent Laid-Open No. 2001-344245, a method is proposed in which an index that manages authority information for respective files is generated, and a display of search results is controlled based on an authority of a search user. Also, in Japanese Patent Laid-Open No. 2008-83961, a method is recited in which authority information is added to keywords, and display of keyword search results and content masking is controlled based on an authority of a search user.

However, in the method recited in Japanese Patent Laid-Open No. 2001-344245, it was only possible to take a form of access control in which access is either permitted or not permitted uniformly for an authority of a user irrespective of the input keyword. Also, in the method recited in Japanese Patent Laid-Open No. 2008-83961, by adding authority information to keywords, not only is access to a file uniformly prohibited, but display is masked from a sentence for only an access prohibited keyword to present to a user. Because of this, access control which presents a sentence in which a prohibited keyword is made to be invisible to a user is realized. However, it was impossible to handle cases in which it is desired that different access authorities be set with respect to content items for keywords added to the content.

SUMMARY OF THE INVENTION

The present invention provides a flexible method of managing content by keyword for solving the problem described above.

According to one aspect of the present invention, there is provided an information processing apparatus comprising: a management unit configured to manage a plurality of content items, keywords associated with the plurality of content items respectively, and authorities of users set to associations between the keywords and the content items; an obtainment unit configured to obtain a keyword and identification information of a user, input by an operation of the user; a search unit configured to search for a content item associated with the input keyword among the plurality of content items managed by the management unit; and a decision unit configured to decide whether the content item searched for by the search unit should be provided to the user or whether provision should be restricted, based on identification information of the user and an authority set for an association between the input keyword and the searched content item.

Further features of the present invention will become apparent from the following description of exemplary embodiments (with reference to the attached drawings).

BRIEF DESCRIPTION OF THE DRAWINGS

Figure 3B:
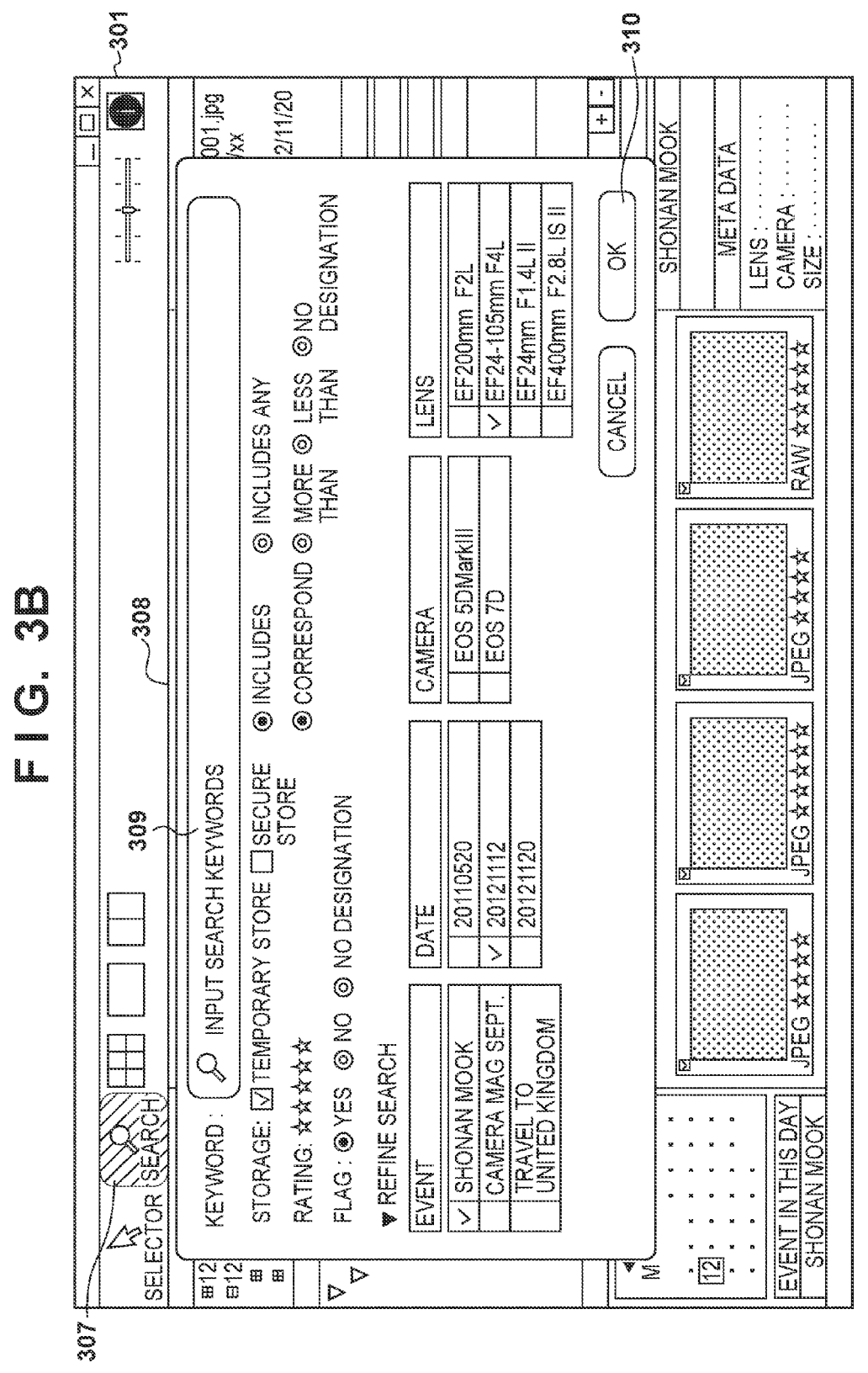

FIGS. 3A to 3C are views illustrating examples of operation screens of a content management system.

FIG. 4 is a data structure that is used in the first embodiment.

FIG. 5 is a flowchart of a keyword addition.

FIGS. 6A and 6B are views for describing a keyword addition operation.

FIGS. 11A and 11B are views for describing a content search operation.

FIG. 14 is a view illustrating an example of a keyword display screen.

DESCRIPTION OF THE EMBODIMENTS

Below, with reference to the attached drawings, a detailed explanation is given for the present invention based on preferred embodiments. Note that configurations illustrated in the following embodiments are merely examples, and the present invention is not limited to the illustrated configurations.

First Embodiment

Figure 1:
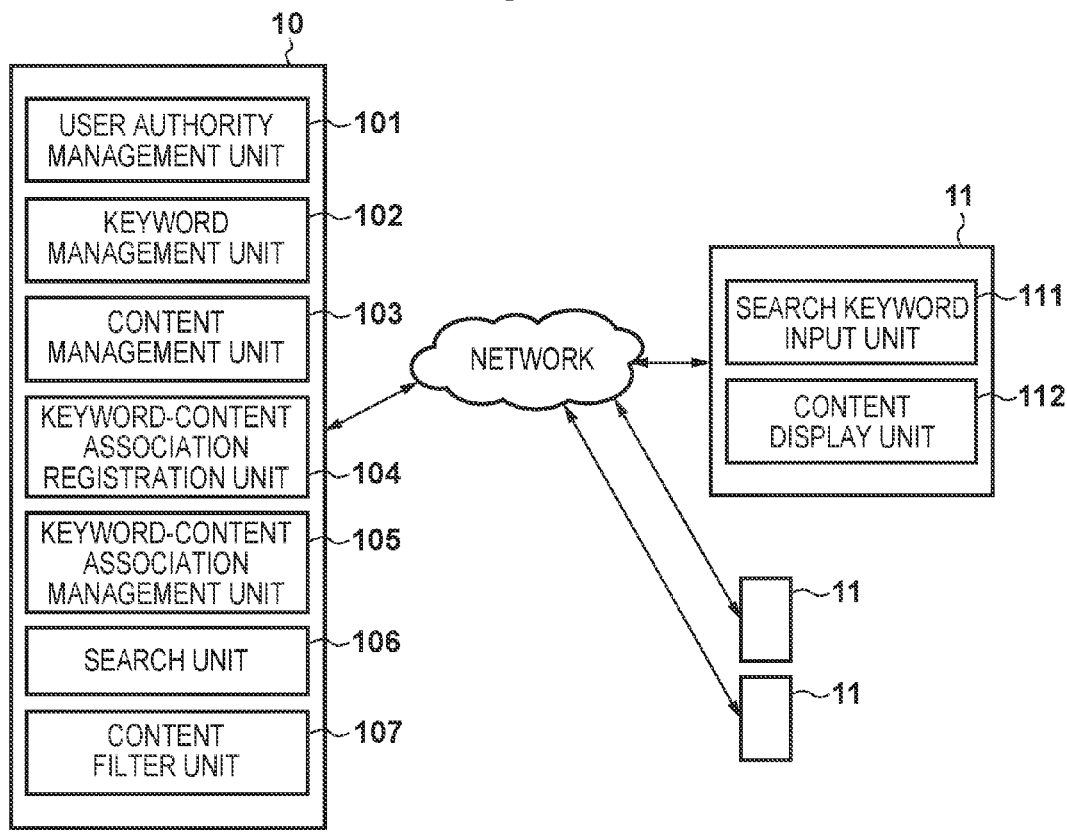
FIG. 1 is a view illustrating a configuration of a content management system in a first embodiment.

A first embodiment of the present invention will be described hereinafter, using the drawings. FIG. 1 is a view illustrating a configuration of a content management system in the present embodiment. A content management system in the present embodiment is a system for managing content items using keywords. The content management system is configured from a server 10 and a plurality of client terminals 11. The server 10 is configured from a user authority management unit 101, a keyword management unit 102, a content management unit 103, a keyword-content association registration unit 104, a keyword-content association management unit 105, a search unit 106, and a content filter unit 107. Meanwhile, the client terminal 11 is configured from a search keyword input unit 111 and a content display unit 112. Hereinafter, details of each configuration element will be illustrated below.

In the server 10, the user authority management unit 101 manages authority information of each user. In the authority information, "administrators" which indicate the administrators of the system, "general users" which indicates not having special authority, "system division" which indicates users of a division that operate the system, and the like exist. The keyword management unit 102 manages keywords used in content management. The content management unit 103 adds identifiers to content items to manage an index. The keyword-content association registration unit 104 forms and registers associations between keywords managed in the keyword management unit 102 and content items managed in the content management unit 103. The keyword-content association management unit 105 manages associations between keywords and content items registered in the keyword-content association registration unit 104. The search unit 106 searches the keyword management unit 102 for keywords that match based on keywords input in the search keyword input unit 111. Additionally, the search unit 106 searches the keyword-content association management unit 105 for associations of content items associated with searched keywords, and the access authority thereof. In the access authority, "no restriction" which permits access to all users, "administrator only permission" which permits access to only the system administrator, "specific division only permission" which access is permitted only for a specific division such as a system division, and the like exists. The content filter unit 107 compares the access authority as output from the search unit 106 of the server 10 to the authority information of a search user, and in a case when content items with no access authority are included in the search results, the content filter unit 107 excludes them.

Meanwhile, in the client terminal 11, the search keyword input unit 111 accepts keywords used in the search of the content items from the user. The content display unit 112 performs a control for displaying on a display screen a list of content items of the search result from which content items with no access authority were excluded by the content filter unit 107.

Figure 2:
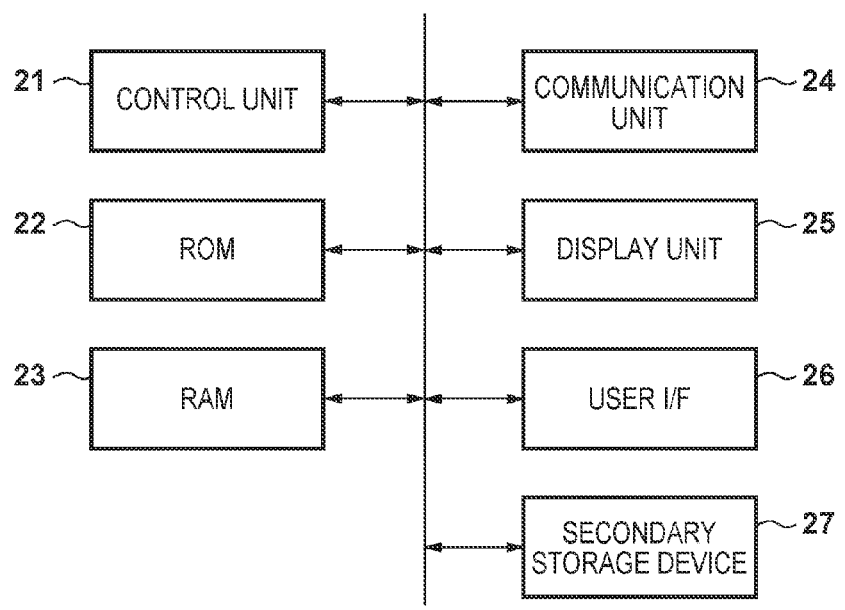
FIG. 2 is a view illustrating one example of a hardware configuration.

FIG. 2 is a view illustrating one example of a hardware configuration of the client terminal 11 and the server 10 as an information processing apparatus in the present embodiment. A control unit 21 is a Central Processing Unit (CPU) for example, and it controls actions of each configuration element. Read Only Memory (ROM) 22 saves control commands, specifically programs. Random Access Memory (RAM) 23 is used for work memory, a temporary storage for data, or the like when the programs are executed. A communication unit 24 performs a control for communication with another apparatus through a network. A display unit 25 performs various displays on a display screen. The display unit 25 is configured in a display panel which displays images for example. The display panel may be configured by LCD, plasma, CRT, or organic EL types, or the like, and may also be a projection type display device such as one that projects on a wall surface. A user I/F (interface) 26 accepts operations of a user. Also, a secondary storage device 27 consists of a storage medium such as a hard disk, and is capable of saving a plurality of content items in the server 10. In the control unit 21 that is configured by a CPU or the like in the server 10 and the client terminal 11, a flowchart described below is executed based on a program that is read out of the ROM 22 into the RAM 23.

Figure 3A:
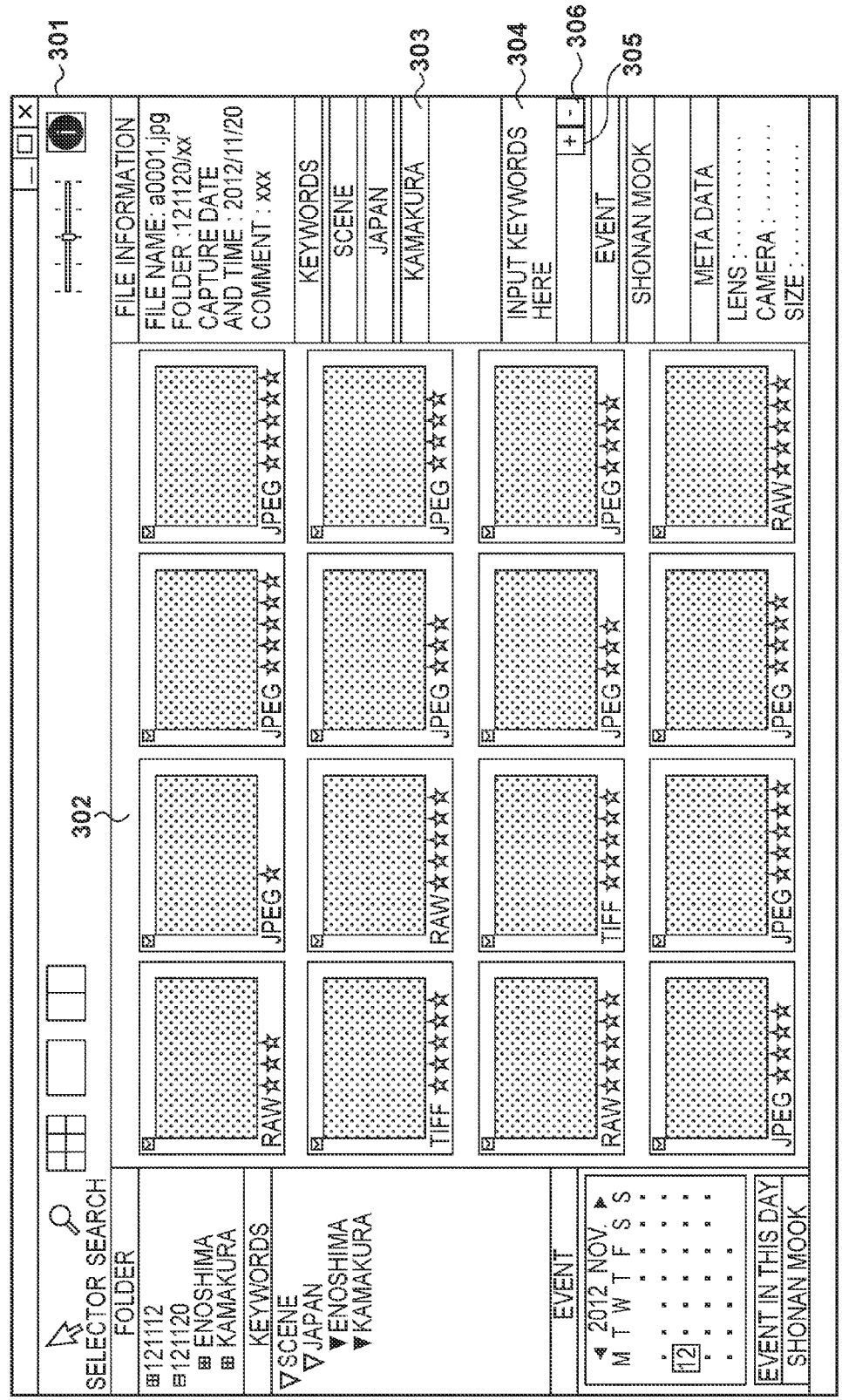

An operation example of the content management system will be described hereinafter using FIGS. 3 through 14 in the present embodiment. Firstly, display screen configurations of the client terminal 11 will be described using FIGS. 3A to 3C in the present embodiment. FIGS. 3A to 3C are views illustrating examples of display screens (operation screens) of the client terminal 11 respectively in the present embodiment. Such display screens are realized using the display unit 25. Note that in the present screen examples, although an embodiment which primarily handles images as content items is explained, the present embodiment is capable of being adapted to other content items such as audio.

In FIG. 3A, a content management screen 301 includes an image selection area 302, a keyword selection area 303, a keyword input region 304, a keyword input finalization button 305, and a keyword deletion button 306. In FIG. 3B, the content management screen 301 includes a search button 307, a search condition setting screen 308, a search keyword input area 309, and a search keyword finalization button 310. In FIG. 3C, the content management screen 301 includes a search result display area 311.

The content management screen 301 shows an entire user interface which saves the image selection area 302 through the search result display area 311. The image selection area 302 accepts a selection of images by user input from a list of displayed images. The keyword selection area 303 accepts a selection of keywords by user input from a list of displayed keywords. The keyword input region 304 accepts input of keywords relating to a particular image which is selected in the image selection area 302. The keyword input finalization button 305 accepts requests for finalizing keywords accepted by the keyword input region 304, and adding them to an image. The keyword deletion button 306 accepts requests for deleting keywords selected in the keyword selection area 303 from an image to which the keywords were added.

In FIG. 3B, the search button 307 accepts a display request based on the search condition setting screen 308. The search condition setting screen 308 shows an entire user interface for setting conditions which perform a search relating to an image. The search keyword input area 309 accepts an input of keywords which are used in the image search. The search keyword finalization button 310 accepts a request for executing an image search according to the keywords input in the search keyword input area 309.

In FIG. 3C, the search result display area 311 displays a list of images as the result of the image search.

FIG. 4 is a data structure that the content management system uses to provide a function in the present embodiment. The data structure is configured from a user management table 401, a content management table 402, a keyword management table 403, a keyword-content association management table 404. In the user management table 401, user IDs which are uniquely assigned to users, and user names passwords, and user roles which indicate the roles of the users are managed linked to the IDs. In the content management table 402, content IDs which are uniquely assigned to content items, content names which indicate file names of content items, and content paths which indicate locations of content items on the OS are managed. In the keyword management table 403, keyword IDs which are to be uniquely assigned to keywords and keywords are managed. In the keyword-content association management table 404, keyword-content association IDs which are uniquely assigned to keyword and content ID associations, keyword IDs, content IDs, and access authorities relating to the associations are managed. These tables are managed in the server 10.

Figure 6A:
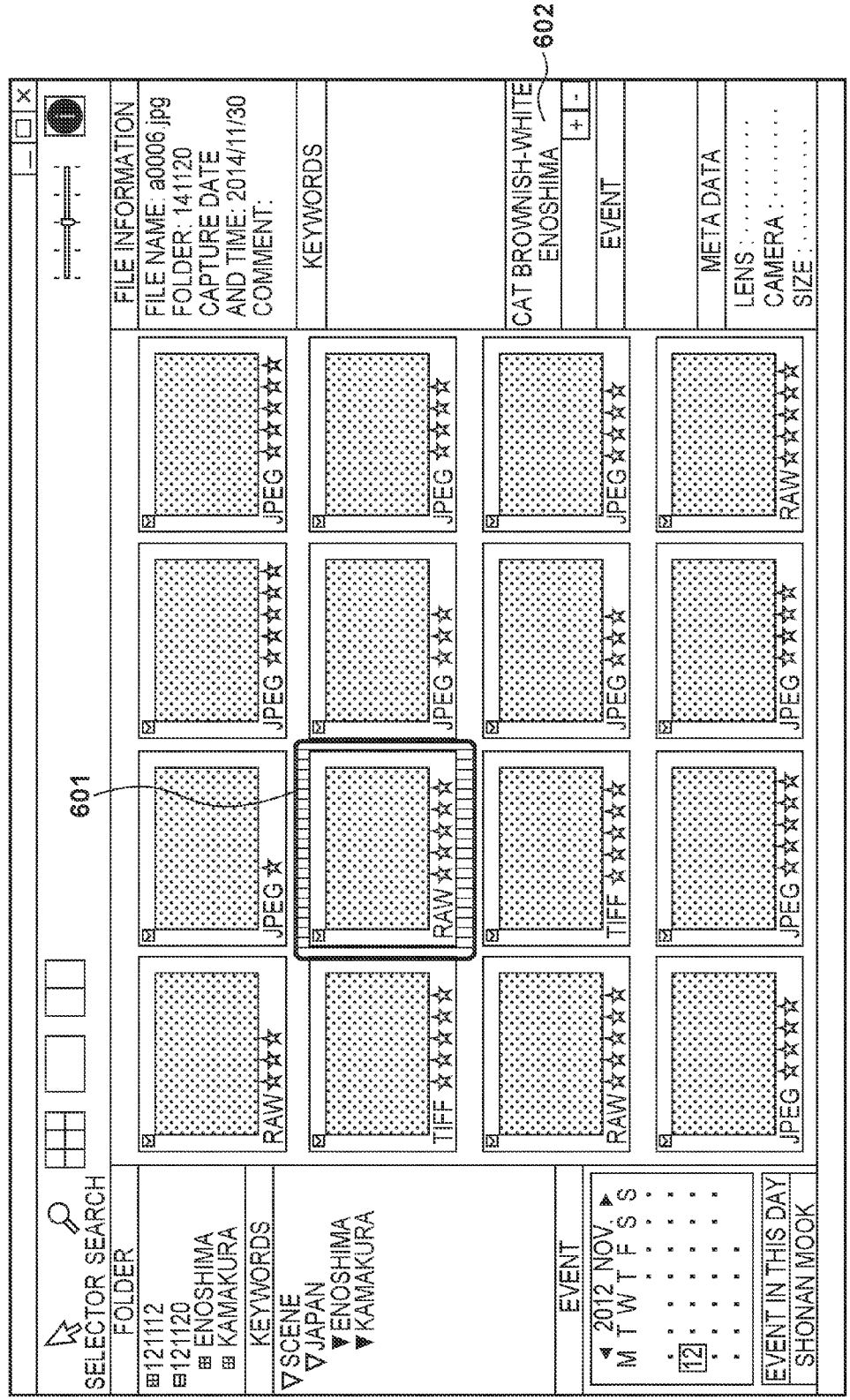

Next, an action for an addition of keywords to content items in the user interface described above will be described using FIGS. 5 through 6. FIG. 5 is a flowchart of a keyword addition, and FIGS. 6A through 6B are views for describing a keyword addition operation on the user interface.

When a keyword addition operation is initiated (step S501), firstly, the content management unit 103 of the server 10 accepts a user selection of a particular image 601 on the image selection area 302 in the client terminal 11 (step S502 and FIG. &A). A content ID in content management table ("c10011" here) is assigned to the image 601 in the image selection area 302. The content management unit 103 obtains the content ID ("c10011" here) in the content management table 402 (step S503) that is assigned to the image in the image selection area 302. Next, the user inputs one or more particular keyword 602 ("cat", "brownish-white", "Enoshima" here) in the keyword input region 304 (FIG. 6B), and when the keyword input finalization button 305 is pressed, the keyword management unit 102 accepts input of the keywords (step S504).

Next, the keyword management unit 102 determines whether the input keywords already exist in the keyword management table 403 (step S505). In a case when an unregistered keyword is input (Yes for step S505), a unique ID for the unregistered keyword is issued by the keyword management unit 102 and is registered to the keyword management table 403 (step S506), and in a case when the input keyword is already registered (No for step S505), processing of step S506 is unnecessary. Here, "0000004" which relates to the unregistered, input keyword "Enoshima" is registered. After this, an association which links the keyword ID corresponding to an input keyword with a content ID corresponding to the image 601 is registered to the keyword-content association management table 404 by the keyword-content association registration unit 104. Then, a unique keyword-content association ID is issued in relation to this registration by the keyword-content association registration unit 104 (step S507). Here, in relation to an image which is managed as a content ID "c10011", associations with the keywords "cat", "brownish-white", and "Enoshima" which are managed as keyword IDs "0000001", "0000002", and "0000004" respectively are formed. Then, keyword-content IDs "r00010002", "r00010003", and "r00010001" are registered.

Figure 6B:
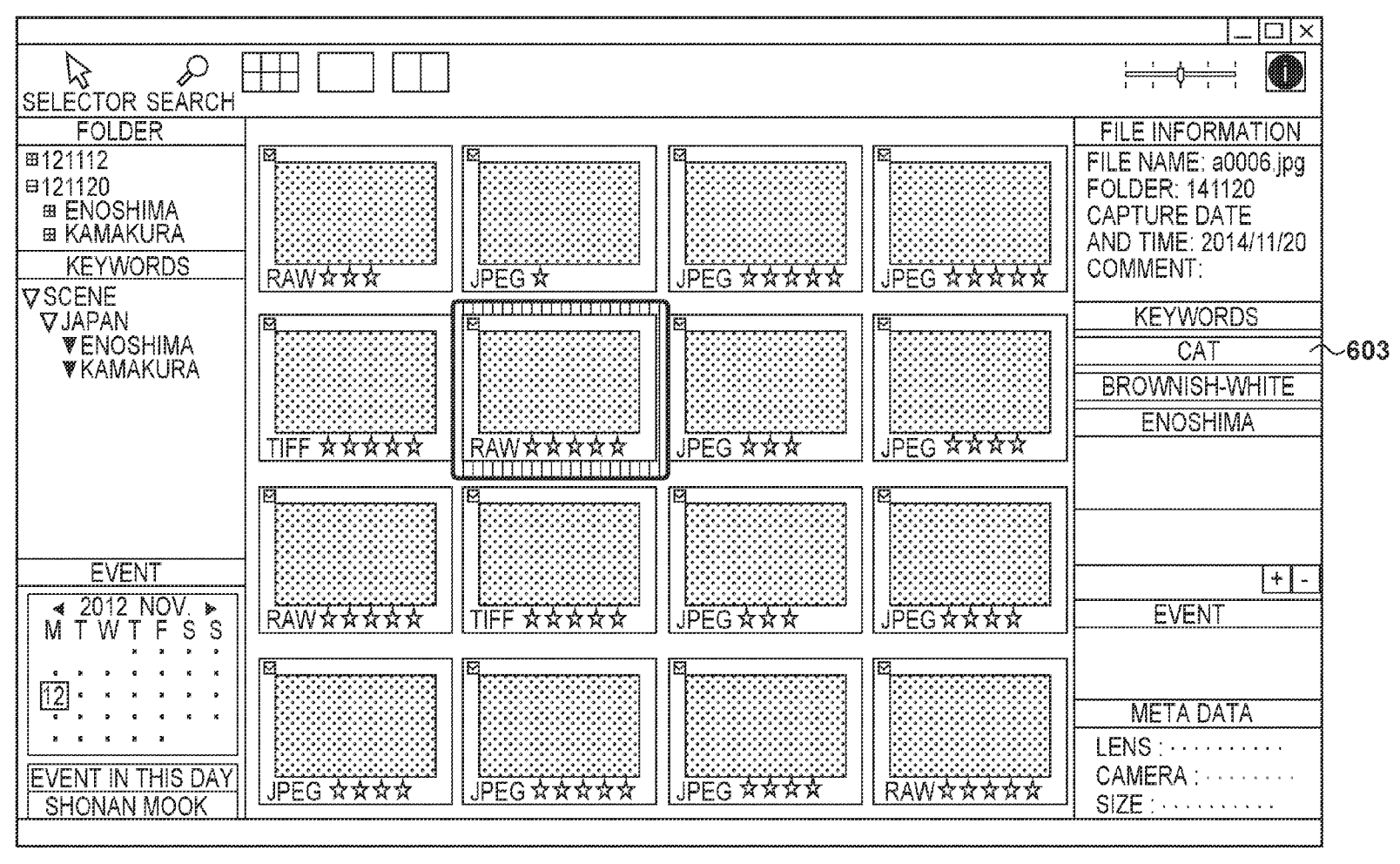

Thereby, an addition of keywords relating to an image is performed, and keywords 603 that were added to the keyword selection area 303 are displayed (step S508, FIG. 6B). At this time, "no restriction" which allows anyone access is set as an initial value regarding the access authority of the keyword-content association.

In a case that a user selects a keyword in the keyword selection area 303, and the selects the keyword deletion button 306, the association of the keyword and the content item is deleted from the keyword-content association management table 404 by the keyword-content association management unit 105. For example, consider a case in which the user selects an image corresponding to the content ID "c10112", selects the keyword "Kamakura" (keyword ID "0000003") that is an association, and presses the keyword deletion button 306. In such a case, a keyword-content association ID "r0001005" which is the association of the keyword ID "0000003" and the content ID "10112" is deleted from the keyword-content association management table 404.

Figure 7:
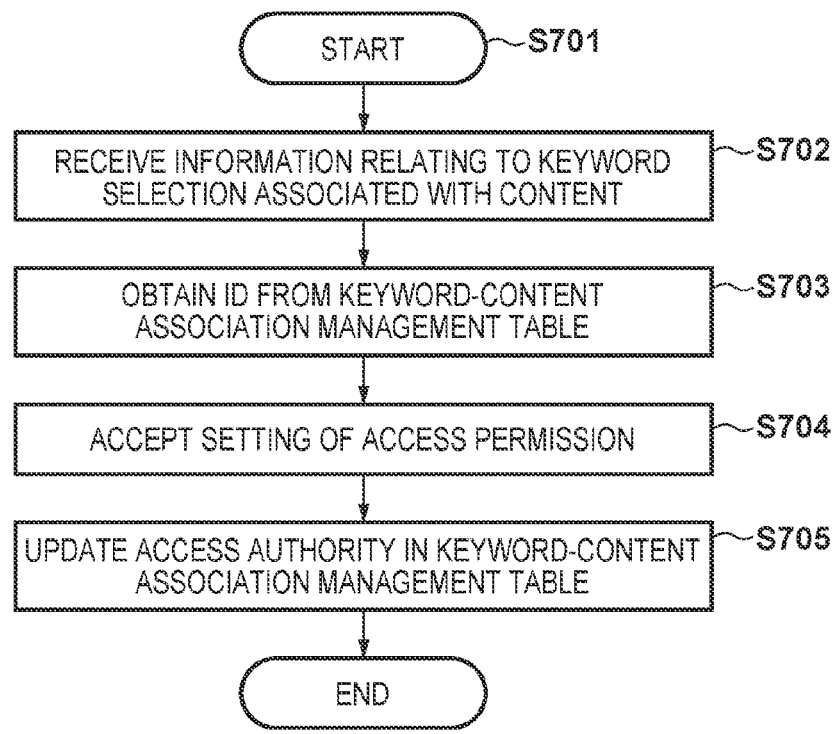
FIG. 7 is a flowchart of an access authority setting.
Figure 8:
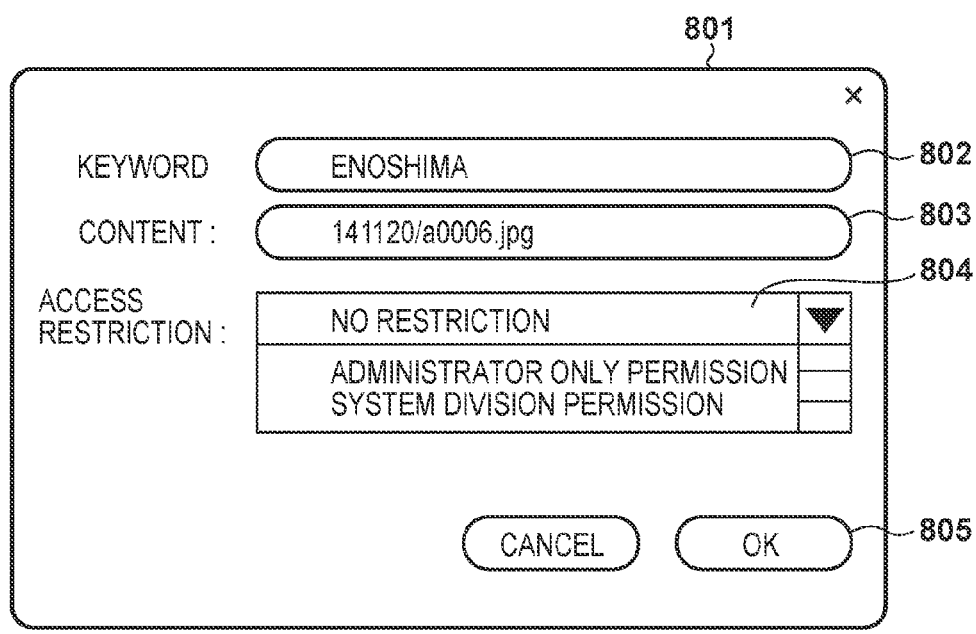
FIG. 8 is a view for describing a keyword access authority setting operation.

Next, the action for setting access authorities for keyword and content item relationships will be described using FIGS. 7 though 8. FIG. 7 is a flowchart of an access authority setting, and FIG. 8 is a view for describing an access authority setting operation on the user interface.

When an access authority setting operation is initiated (step S701), a selection of a particular keyword ("Enoshima" here) that is associated with a selected image (content ID "c10011" here) by a user is received in the keyword selection area 303 on the client terminal 11 (step S702). The keyword displayed in the keyword selection area 303 is linked to a keyword ID which is managed in the keyword management table 403 by the keyword management unit 102. When information relating to the keyword selection is received, the keyword-content association management unit 105 obtains from the keyword-content association management table 404 the keyword-content association ID corresponding to the content item relating to the selected keywords (step S703). Along with this, the keyword-content association management unit 105 causes an authority setting dialogue screen 801 to be displayed on the display screen on the client terminal 11. Here, the keyword-content association management unit 105 obtains a keyword-content ID "r00010001" which is an association of an image which is managed with the content ID "c10011", and the keyword "Enoshima" managed with the keyword ID "0000004" (step S703).

The authority setting dialogue screen 801 is configured from a keyword display area 802, a content path display area 803, an access restriction selection drop box 804, and an OK button 805. After step S702, the keyword selected in step S702 ("Enoshima" here) is displayed in the keyword display area 802 on the authority setting dialogue screen 801 displayed on the display screen of the client terminal 11. Also, the path of the content item ("141120/a0006.jpg" here) which is associated with the selected keyword is displayed in the content path display area 803. The user selects a particular access permission restriction ("administrator only permission" here) from the access restriction selection drop box 804, and selects the OK button 805 to finalize. In accordance with this, a change of access authority is accepted in relation to the association between the content item displayed in the content path display area 803 and the keyword displayed in the keyword display area 802 (step S704). In accordance with a modification instruction from the user, the keyword-content association management unit 105 updates the access authority of the corresponding the keyword-association ID in the keyword-content association management table 404 to the access permission restriction designated in step S704 (step S705).

Figure 9:
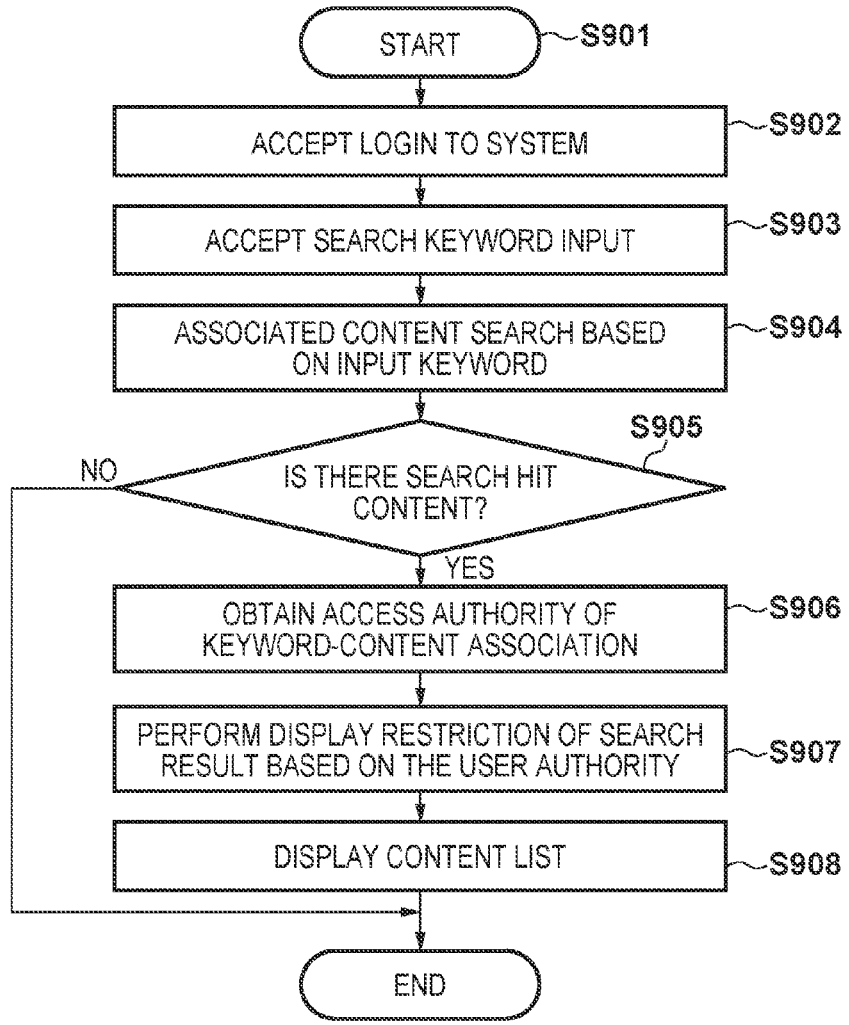
FIG. 9 is a flowchart of a content search.
Figure 10:
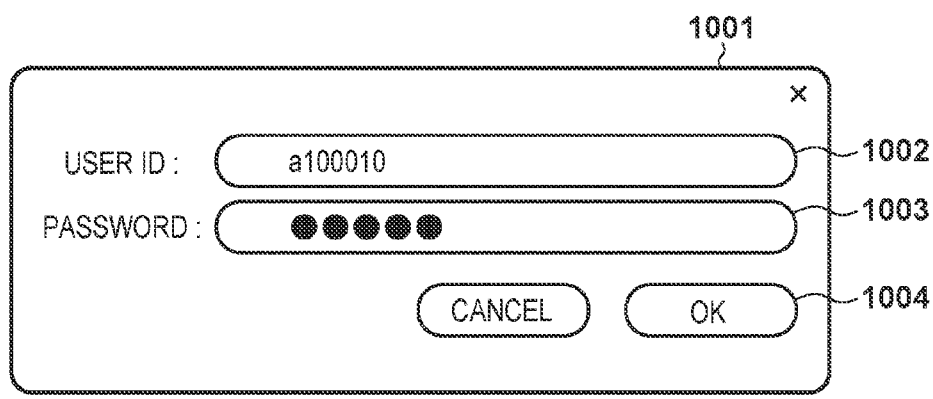
FIG. 10 is a view for describing a user login operation.

Next, a restriction action of a display of results and a content search based on an association of a keyword and a content item will be described using FIGS. 9 through 11B. FIG. 9 is a view for describing a flowchart of a content search, FIG. 10 is a view for describing a user login operation on a user interface, and FIGS. 11A through 11B are views for describing a content search operation on the user interface.

In accordance with a user operation, when a content search according to a keyword is initiated (step S901), firstly, a process for login to the system is executed from a login screen 1001 displayed on the display screen of the client terminal 11. Note, it is assumed that a subsequent user is a second user for which an action for an addition (FIG. 5) of a keyword in relation to a content item and an action for setting an access authority in relation to a relationship of a keyword and a content item (FIG. 7) are different. The login screen 1001 is composed of a user ID input area 1002, a password input area 1003, and an OK button 1004. The user inputs his user ID (user information) into the user ID input area 1002 (the user ID is "a10010" here), inputs his password into the password input area, and then selects an OK button 904 to finalize. In a case when the user ID and password which exist in the user management table 401 match what was input, the user authority management unit 101 of the server 10 which accepted the information of the password input, determines that the user succeeded in logging in (step S902). When the user has succeeded in logging in, the user authority management unit 101 closes the login screen 1001 and causes the content management screen 301 to be displayed on the display screen of the client terminal 11.

When the user selects the search button 307 on the content management screen 301, the client terminal 11 displays the search condition setting screen 308 on the display screen. When the user inputs a keyword 1101 ("Enoshima" here) into the search keyword input area 309 on the search condition setting screen 308 in the client terminal 11, the search keyword input unit 111 accepts the keyword input (step S903). Additionally, when a user selects the search keyword finalization button 310 in the client terminal 11, the search unit 106 of the server 10 executes a content search which targets the keyword 1101 based on the input keyword (step S904).

Figure 11A:
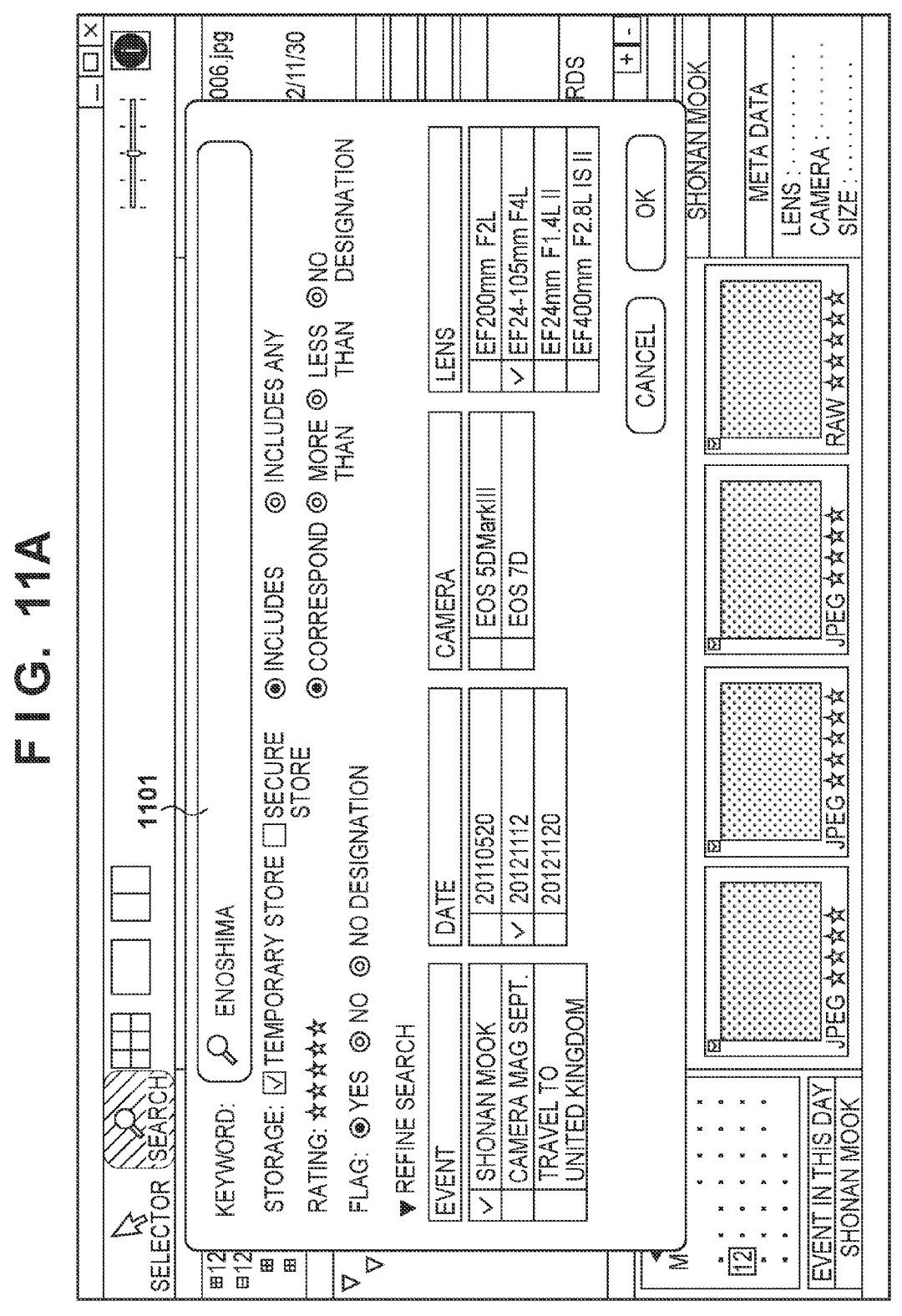

As an example, as illustrated in FIG. 11A, "Enoshima" is input as the input keyword 1101 by the user. The search unit 106 receives this keyword and performs the content extraction processing. More specifically, the search unit 106 extracts a content item which is associated with the input keyword from the keyword-content association management table 404 (i.e. a hit) where the key is the keyword ID "0000004" in the keyword management table 403 which corresponds to that keyword. Here, two content search results associated with the keyword ID "0000004" are extracted: the content ID "c10012" and keyword-content association ID "r00010001"; and the content ID "c10011" and keyword-content association ID r00010004. In such a case, because more than one search result exists (step S905), display restriction processing of a next content item is performed.

If there is a search hit keyword-content association ID (Yes for step S905), content item display restriction processing is performed. In the content item display restriction processing, firstly, the keyword-content association management unit 105 obtains the access restriction information from the keyword-content association management table 404 based on the keyword-content association ID that hit in the search (step S906). Here, "administrator only permission" is obtained as an access authority corresponding to the keyword-content association ID "r00010001" and "no restriction" is obtained as an access authority corresponding to the keyword-content association ID "r00010004".

When obtainment of the access authority has been performed, next, the content filter unit 107 performs display restrictions of the content search results based on the user authority (step S907). At a time of content search result display restriction processing, firstly, the user authority management unit 101 obtains the authority information from the user management table 401 of the user who performed the login in step S902. Here, the user role "general user" corresponding to the user ID "a10011" is obtained. In contrast to the "general user" user role, content items corresponding to content IDs which have the authority "administrator only within the access authority relating to the two keyword-content association IDs obtained in step S906 are decided as targets of the display restriction (access restriction). Meanwhile, no restriction" is decided as displayable without becoming a target of the display restriction.

When the client terminal 11 receives information relating to the display restriction of the content search results, the content display unit 112 displays a list of search results based on the display restriction results into a search result display area 1102 (step S908, FIG. 11B). In the present embodiment, the keyword 1101 "Enoshima" which was input into the display screen of the client terminal 11 is displayed as a search condition (FIG. 11A). Also, the client terminal 11 provides from the content management table 402 a content path of the content ID "c10012" corresponding to the keyword-content association ID "r00010004" which is the search result and displays an obtained image 1103 (FIG. 11B). In the present example, the content path is "141220/0111.jpg.

In the present embodiment, although it is described regarding a case in which there is one input keyword at a time of a search, there may be a plurality of input keywords. If there are a plurality of input keywords, two examples—cases in which the input keywords are combined with an AND condition and cases in which they are combined with an OR condition—can be considered. In the case in which the input keywords are combined with the AND condition, if there is even one keyword within the plurality of keywords which corresponds to a keyword-content association that does not have an access authority, the content item corresponding to that keyword is excluded from the search results. Also, in the case in which the input keywords are combined with the OR condition, if all of the keywords are keywords which correspond to a keyword-content associations that do not have an access authority, the content item corresponding to that keyword is excluded from the search results.

With such a configuration, in the present embodiment, in the system which comprises the server 10 and the client terminal 11, by adding authorities to associations of content items and keywords, restrictions can be changed in accordance with the context of the content items to which they are added. Hence, controlling permission/prohibition of access for each content item even when searching with the same keywords can be easily realized.

Second Embodiment

Figure 12:
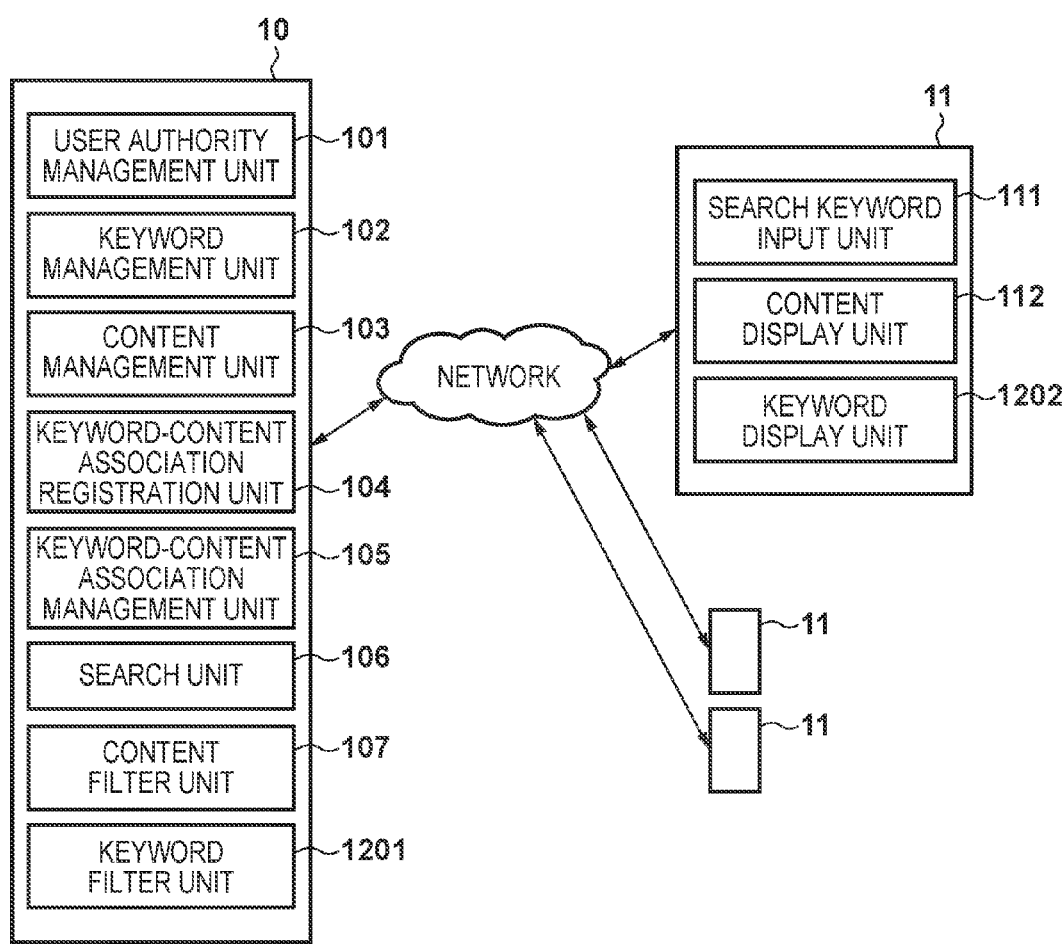
FIG. 12 is a view illustrating a configuration of a content management system in a second embodiment.

A second embodiment of the present invention will be described hereinafter, using the drawings. FIG. 12 is a configuration diagram of a content management system in the present embodiment. A content management system in the present embodiment is a system for managing content items using keywords. Compared to FIG. 1 described in the first embodiment, the server 10 is different in that it has an additional keyword filter unit 1201, and the client terminal 11 is different in that it has an additional keyword display unit 1202. Because of this, the keyword filter unit 1201 and the keyword display unit 1202 will be explained below.

The keyword filter unit 1201 compares the authority information of the search user with an access authority which is output of the search unit 106, to restrict the keywords that are displayed. The keyword display unit 1202 displays a list of keywords for which a display restriction was performed by the keyword filter unit 1201.

Figure 13:
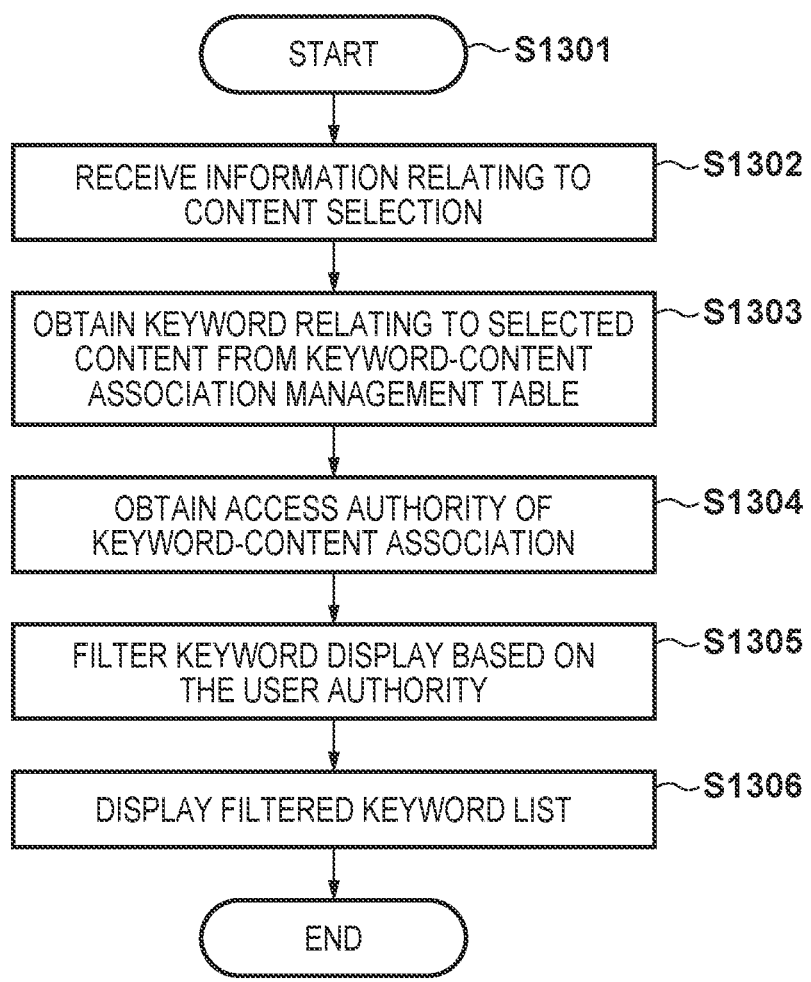
FIG. 13 is a flowchart of a keyword display.
Figure 14:
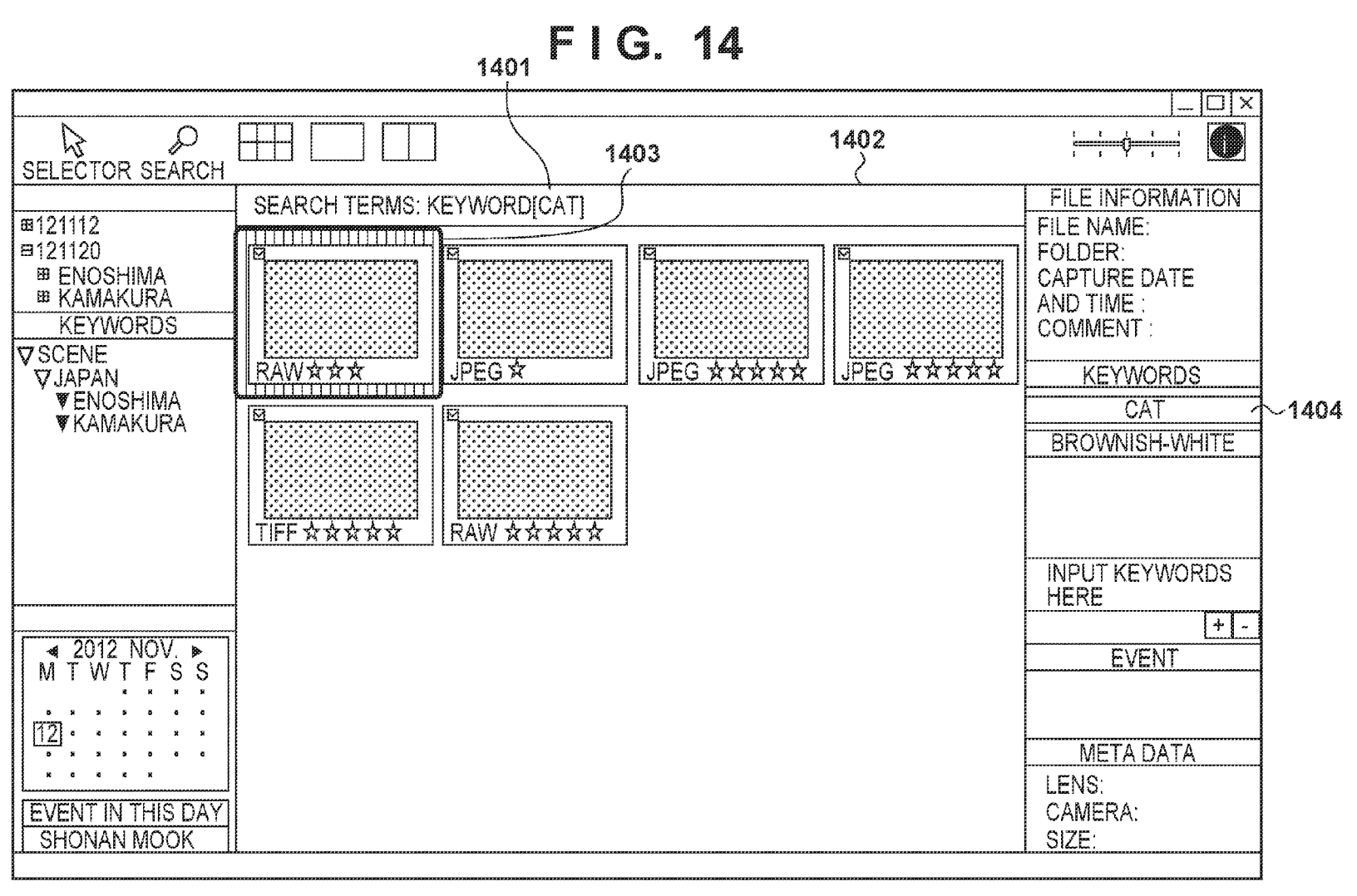

Next, in the present embodiment, a keyword display action, which performs a display restriction based on associations between keywords and content items, will be described using FIGS. 13 through 14. FIG. 13 is a flowchart of a keyword display, and FIG. 14 is a view for describing a keyword display on the user interface. In the content search sequence recited in FIG. 9 of the first embodiment, the following are established as the pre-conditions of the present embodiment. Specifically, a user which is managed as the user ID "a10011" ("general user") inputs the keyword "cat" (keyword ID "0000001") on the client terminal 11 to execute a search based on the data recited in FIG. 4. As a result, a list of search results which include the content ID "c10011" which associates with the keyword-content association ID "r00010002" which the user can access is returned from the server 10 to the client terminal 11. Then, this along with a search keyword 1401 becomes displayed on the user interface (1402) on the display screen of the client terminal 11.

When a keyword display sequence (step S1301) is initiated in the client terminal 11, the content management unit 103 receives information relating to a selection of a particular content item from the list of search results via the network (step S1302). At this time, the user selects a particular image from a search result display area 1402 which is displayed on the image selection area 302 on the user interface. Here, the user selects an image 1403 corresponding to the content ID "c10011". When the information relating to the selection of the content item is received, the keyword-content association management unit 105 obtains an ID of a content item-keyword association from the keyword-content association management table 404 with the ID of the selected content item as the key (step S1303). Here, the keyword-content association IDs "r00010001", "r00010002", and "r00010003" associated with the content ID "c10011" are obtained.

Next, the keyword-content association management unit 105 obtains access authorities based on the keyword-content ID that associates the selected content item from the keyword-content association management table 404 (step S1304). Here, "administrator only is obtained as an access authority corresponding to "r00010001" and no restriction" is obtained as an access authority corresponding to "r00010002" and "r00010003". Next, the keyword filter unit 1201 performs a display restriction of displayed keywords based on the access authorities of the obtained keyword-content associations and the authority of the user who is logged onto the system (step S1305).

In the present example, the keyword-content association ID "r00010001" which holds the access authority of "administrator only" becomes a target of the display restriction because the authority of the user ID "a10011" who is logged on is "general user". Thus, only the keyword "cat" (keyword ID "0000002") which associates with "r00010002" and the keyword "brownish-white" (keyword ID "0000003") which associates "r00010003" are displayable. Finally, the keyword display unit 1202 of the client terminal 11 display a list of keywords which are associated with the selected content item based on the display restriction results (step S1306). In the present example, among the keywords which are associated with the selected image 1403 (content ID "c10011"), "brownish-white" (keyword ID "0000003") and "cat" (the keyword ID "0000002"), which are the association keywords to which user "a10011" has access authority, are displayed in a keyword selection area 1404 (1404).

With such a configuration, in the system comprising the server 10 and the client terminal 11 in the present embodiment, a flexible keyword display control in which a restriction can be changed in accordance with context of a content item to which the same keyword is added becomes possible.

Note, in the foregoing embodiment, configuration of the client terminal and server are described using FIG. 1 and FIG. 12, but configuration is not limited to what is illustrated. In other words, if the form is such that the above described embodiments can be realized, in the content management system which is configured from a server and a plurality of client terminals, each configuration element illustrated in FIG. 1 and FIG. 12 may also be comprised of any server or plurality of client terminals.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-182224, filed Sep. 15, 2015 which is hereby incorporated by reference herein in its entirety.

What is claimed is:

1. An information processing apparatus comprising:
one or more processors; and
a memory having stored thereon instructions which, when executed by the one or more processors, cause the information processing apparatus to function as:
a management unit configured to manage authorities, each of which is set to each of one or more keywords which are associated with each of a plurality of contents, wherein each of the authorities allows a corresponding group of users to receive provision of content associated with the one or more keywords;
an obtainment unit configured to obtain user identification information of a user and a keyword input by the user; and
a control unit configured to exclude, from one or more contents to be displayed on a predetermined display as a result of a search of content associated with the keyword obtained by the obtainment unit from the plurality of contents, any content whose provision to a user indicated in the user identification information obtained by the obtainment unit is restricted by an authority set to the keyword obtained by the obtainment unit, wherein
in a case where the keyword obtained by the obtainment unit is a first keyword and the user indicated in the user identification information obtained by the obtainment unit is not given an authority for receiving provision of a first content set to the first keyword, the control unit excludes the first content from content displayed on the predetermined display as results of a search of content associated with the first keyword,
in a case where the keyword obtained by the obtainment unit is a second keyword and the user indicated in the user identification information obtained by the obtainment unit is given an authority for receiving provision of a second content set to the second keyword, where the second content is different from the first content set to the first keyword, the control unit displays, on the predetermined display, one or more contents including the second content as results of a search of content associated with the second keyword, each of the plurality of contents is an image, and the first keyword, to which the authority which cannot provide any content to a part or users is set, represents a position with respect to the image.

2. The information processing apparatus according to claim 1, wherein in a case when a plurality of keywords are input by the user, the control unit specifies any content whose provision to the user indicated in the user identification information obtained by the obtainment unit is restricted by an authority set with respect to at least one keyword among the plurality of keywords.

3. The information processing apparatus according to claim 1, wherein in a case when a plurality of keywords are input by the user, the control unit specifies any content whose provision to the user indicated in the user identification information obtained by the obtainment unit is restricted by an authority set with respect to all of the plurality of keywords.

4. The information processing apparatus according to claim 1, wherein, in response to a selection of one content while at least part of the plurality of contents are displayed, the control unit controls to display, on the predetermined display, one or more keywords associated with the selected content, and wherein the instructions, when executed by the one or more processors, cause the information processing apparatus to further function as a keyword-filtering unit configured to exclude any keyword whose provision to the user indicated in the user identification information obtained by the obtainment unit is restricted by an authority managed by the management unit, from the one or more keywords to be displayed as the one or more keywords associated with the selected content.

5. The information processing apparatus according to claim 1, wherein the plurality of contents include an image or an audio.

6. The information processing apparatus according to claim 1, wherein the management unit manages the authorities, each of which is set to each of the one or more keywords associated with each of the plurality of contents by using a keyword-content association management table which comprises entries of content IDs of the plurality of contents, keyword IDs of the keywords, the authorities, and keyword-content association IDs for indicating their association, and, the control unit specifies by referring to the keyword-content association management table, any content whose provision to the user indicated in the user identification information obtained by the obtainment unit is restricted.

7. The information processing apparatus according to claim 1, wherein the instructions, when executed by the one or more processors, cause the information processing apparatus to function as a search unit configured to search any content associated with the keyword obtained by the obtainment unit, and wherein the control unit specifies any content whose provision to the user indicated in the user identification information obtained by the obtainment unit is restricted by the authority set to the keyword obtained by the obtainment unit among one or more contents which are result of the search by the search unit, and excludes the specified content from content displayed on the predetermined display as results of the search by the search unit.

8. The information processing apparatus according to claim 7, wherein the management unit manages authorities set to a combination of each of the plurality of contents and each of the one or more keywords, each of which is associated with the each of the plurality of contents, and the control unit specifies any content whose provision to the user indicated in the user identification information obtained by the obtainment unit, by the authority set to a combination of the content among the one or more contents as result of the search and the keyword obtained by the obtainment unit.

9. The information processing apparatus according to claim 1, wherein in a case where the keyword obtained by the obtainment unit is the second keyword and the user indicated in the user identification information obtained by the obtainment unit is given the authority to receive provision of the second content set to the second keyword, the control unit displays, on the predetermined display, the one or more contents including the second content as results of the search of content associated with the keyword obtained by the obtainment unit.

10. The information processing apparatus according to claim 1, wherein in response to a selection of a target content while at least part of the plurality of contents are displayed, the control unit controls to display, on the predetermined display, one or more keywords associated with the target content.

11. The information processing apparatus according to claim 10, wherein in a case where the user indicated in the user identification information obtained by the obtainment unit is not given the authority for receiving provision of the first content set to the first keyword, and is given the authority for receiving provision of the second content set to the second keyword, in response to a selection of the second content as the target content while one or more contents including the second content are displayed, as results of the search by the search unit, the control unit excludes the first keyword from the one or more keywords associated with the first content to be displayed on the predetermined display.

12. An information processing method comprising:

managing authorities, each of which is set to each of one or more keywords which are associated with each of a plurality of contents, wherein each of the authorities allows a corresponding group of users to receive provision of content associated with the one or more keywords;

obtaining user identification information of a user and a keyword input by the user; and excluding, from one or more contents to be displayed on a predetermined display as a result of a search of content associated with the obtained keyword from the plurality of contents, any content whose provision to the user indicated in the obtained user identification information is restricted by an authority set to the obtained keyword, wherein in a case where the obtained keyword is a first keyword and the user indicated in the obtained user identification information is not given an authority for receiving provision of a first content set to the first keyword, the first content is excluded from content displayed on the predetermined display as results of a search of content associated with the first keyword, in a case where the obtained keyword is a second keyword and the user indicated in the obtained user identification information is given an authority for receiving provision of a second content set to the second keyword, where the second content is different from the first content set to the first keyword, on the predetermined display, one or more contents including the second content is displayed as results of a search of content associated with the second keyword, each of the plurality of contents is an image, and the first keyword, to which the authority which cannot provide any content to a part or users is set, represents a position with respect to the image.

13. The information processing method according to claim 12, further comprising, in response to a selection of one content while at least part of the plurality of contents are displayed and one or more keywords associated with the selected content is controlled to be displayed on the predetermined display, excluding any keyword whose provision to the user indicated in the obtained user identification information is restricted by a managed authority, from the one or more keywords to be displayed as the one or more keywords associated with the selected content.

14. A content management system comprising a server and a plurality of client terminals, and comprising:
   one or more processors; and
   a memory having stored thereon instructions which, when executed by the one or more processors, cause the content management system to function as:
      a management unit configured to manage authorities, each of which is set to each of one or more keywords which are associated with each of a plurality of contents, wherein each of the authorities allows a corresponding group of users to receive provision of content associated with the one or more keywords;
      an obtainment unit configured to obtain user identification information of a user and a keyword input by the user; and
      a control unit configured to exclude, from one or more contents to be displayed on a predetermined display as a result of a search of content associated with the keyword obtained by the obtainment unit from the plurality of contents, any content whose provision to the user indicated in the user identification information obtained by the obtainment unit is restricted by an authority set to the keyword obtained by the obtainment unit, wherein
   in a case where the keyword obtained by the obtainment unit is a first keyword and the user indicated in the user identification information obtained by the obtainment unit is not given an authority for receiving provision of a first content set to the first keyword, the control unit excludes the first content from content displayed on the predetermined display as results of a search of content associated with the first keyword,
   in a case where the keyword obtained by the obtainment unit is a second keyword and the user indicated in the user identification information obtained by the obtainment unit is given an authority for receiving provision of a second content set to the second keyword, where the second content is different from the first content set to the first keyword, the control unit displays, on the predetermined display, one or more contents including the second content as results of a search of content associated with the second keyword, each of the plurality of contents is an image, and
the first keyword, to which the authority which cannot provide any content to a part or users is set, represents a position with respect to the image.

15. A non-transitory computer readable storage medium storing a program for causing a computer to control an information processing apparatus, the program causing the computer to function as:
   a management unit configured to manage authorities, each of which is set to each of one or more keywords which are associated with each of a plurality of contents, wherein each of the authorities allows a corresponding group of users to receive provision of content associated with the one or more keywords;
   an obtainment unit configured to obtain user identification information of a user and a keyword input by the user; and
   a control unit configured to exclude, from one or more contents to be displayed on a predetermined display as a result of a search of content associated with the keyword obtained by the obtainment unit from the plurality of contents, any content whose provision to the user indicated in the user identification information obtained by the obtainment unit is restricted by an authority set to the keyword obtained by the obtainment unit, wherein
   in a case where the keyword obtained by the obtainment unit is a first keyword and the user indicated in the user identification information obtained by the obtainment unit is not given an authority for receiving provision of a first content set to the first keyword, the control unit excludes the first content from content displayed on the predetermined display as results of a search of content associated with the first keyword,
   in a case where the keyword obtained by the obtainment unit is a second keyword and the user indicated in the user identification information obtained by the obtainment unit is given an authority for receiving provision of a second content set to the second keyword, where the second content is different from the first content set to the first keyword, the control unit displays, on the predetermined display, one or more contents including the second content as results of a search of content associated with the second keyword, each of the plurality of contents is an image, and
the first keyword, to which the authority which cannot provide any content to a part or users is set, represents a position with respect to the image.

16. The storage medium according to claim 15, wherein, in response to a selection of one content while at least part of the plurality of contents are displayed, the control unit controls to display, on the predetermined display, one or more keywords associated with the selected content, and
   wherein the program causes the computer to further function as a keyword-filtering unit configured to exclude any keyword whose provision to the user indicated in the user identification information obtained by the obtainment unit is restricted by the authority managed by the management unit, from the one or more keywords to be displayed as the one or more keywords associated with the selected content.

* * * * *